United States Patent
Stein et al.

[11] 3,790,799
[45] Feb. 5, 1974

[54] RADIANT ENERGY IMAGING WITH ROCKING SCANNING

[75] Inventors: Jay A. Stein, Framingham; Gerald Polucci, Cambridge, both of Mass.

[73] Assignee: American Science & Engineering Inc., Cambridge, Mass.

[22] Filed: June 21, 1972

[21] Appl. No.: 264,857

[52] U.S. Cl.................. 250/363, 250/366, 250/505
[51] Int. Cl............................................. G01t 1/20
[58] Field of Search ... 250/61.5, 71.5 R, 71.5 S, 91, 250/92, 105, 363, 366, 505

[56] References Cited
UNITED STATES PATENTS

| | | | |
|---|---|---|---|
| 2,491,224 | 12/1949 | Stava ................................. | 250/61.5 |
| 2,916,627 | 12/1959 | Rolke .............................. | 250/61.5 X |
| 3,107,276 | 10/1963 | Cohen .............................. | 250/105 X |
| 3,275,831 | 9/1966 | Martin ............................... | 250/105 |
| 3,317,738 | 5/1967 | Piepenbrink et al........ | 250/71.5 R X |
| 3,449,569 | 6/1969 | Garcia Oller ..................... | 250/91 X |

*Primary Examiner*—Archie R. Borchelt
*Attorney, Agent, or Firm*—Charles Hieken & Jerry Cohen

[57] ABSTRACT

A pencil beam of X-rays scans an object along a line of direction along a line X-ray detector to produce an image of the line along a picture tube. The object scanned and the line of scan are relatively displaced by rocking the X-ray source and line detector about an axis substantially passing through a slit which collimates the X-ray energy into a fan beam intercepted by a rotating disc with radial slits that provides the scanning pencil beam. The X-ray detector preferably comprises sodium iodide elements imbedded in a light pipe with a photocell at each end of the light pipe.

10 Claims, 4 Drawing Figures

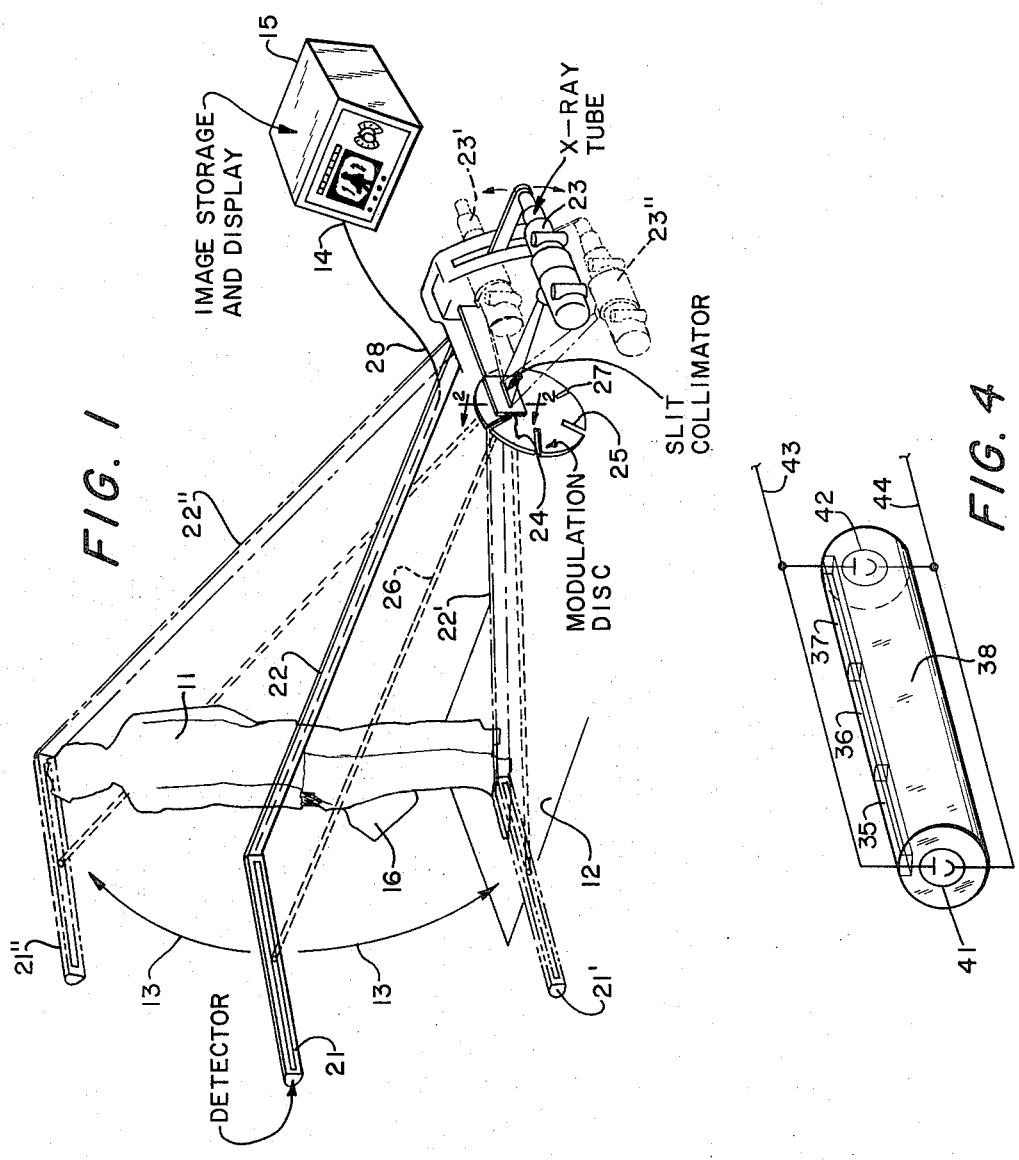

RADIANT ENERGY IMAGING WITH ROCKING SCANNING

BACKGROUND OF THE INVENTION

The present invention relates in general to radiant energy imaging and more particularly concerns novel apparatus and techniques for displaying a visual image of concealed objects on a person with sufficient resolution to identify the object while keeping the intensity of radiation relatively low. The system is reliable, relatively economical and may be operated by relatively unskilled personnel.

The problem of detecting contraband concealed in packages and on persons is a serious one. X-ray equipment is useful for assisting in the discovery of concealed contraband. Conventional X-ray equipment is costly, requires operation by skilled personnel and may well subject personnel and parcels to undesired excessive dangerous radiation.

American Science & Engineering, Inc. has supplied a parcel inspection system to the U.S. Postal Laboratory at Rockville Maryland. That system includes means for scanning a line X-ray detector with a pencil beam of X-ray energy to provide a line image signal characteristic of the X-ray response of the parcel being scanned, and a television display system for displaying the sequenc of image signals derived on the line detector as the parcel moves past. The detector comprises a sodium iodide crystal that produces a visible manifestation of the intensity of the incident radiation that is sensed by a photodetector to provide a characteristic video output signal that may be applied to the television display having an image storage tube. American Science & Engineering, Inc., had also proposed using the invention for scanning people by moving the X-ray source and detector together vertically and thereby scan a person.

It is an important object of this invention to provide apparatus and techniques that retain the advantages of the invention discussed above while providing additional advantages.

It is a further object of the invention to provide an improved personnel inspection system in accordance with the preceding object.

It is still a further object of the invention to achieve one or more of the preceding objects with an improved detector.

It is still a further object of the invention to achieve one or more of the preceding objects with apparatus that is relatively inexpensive and easy to fabricate and use while operating reliably with relatively unskilled personnel.

SUMMARY OF THE INVENTION

According to the invention, there is means for scanning a radiation sensitive detector along a curve with a pencil beam of radiation to provide a line image signal characteristic of radiant energy response between the source of the pencil beam and the radiation sensitive detector, means for displaying the image represented by the image signal, slit means comprising the source of the pencil beam for providing a fan beam, a source of radiant energy, and means for angularly displacing the source of radiant energy and the radiation sensitive detector together about an axis included by the slit means while maintaining the detector and radiant energy source in fixed relationship.

Preferably the detector comprises at least one segment of a sodium iodide or cesium iodide crystal imbedded in a light pipe that produces a visible manifestation of the intensity of the incident X-ray radiation, the light pipe preferably having a photocell at each end to collect virtually all the light energy provided by the crystals in response to radiant energy incident thereon.

Numerous other features, objects and advantages of the invention will become apparent from the following specification when read in connection with the accompanying drawing in which:

BRIEF DESCRIPTION OF THE DRAWING

FIG. 1 is a pictorial representation of a person inspection system according to the invention;

FIG. 2 is a sectional view through section 2—2 of FIG. 1 illustrating the preferred form of the slit cross section along the axis of the scanning beam;

FIG. 3 is an alternate slit section; and

FIG. 4 is a perspective view of a preferred form of detector.

DETAILED DESCRIPTION OF PREFERRED EMBODIMENTS

With reference now to the drawing and more particularly FIG. 1 thereof, there is shown a pictorial representation of a preferred embodiment of the invention that is especially convenient for personnel inspection. A person 11 to be inspected stands on a platform 12 of material that is transparent to X-rays, and the assembly scans the sector 13 to provide an X-ray image 14 on image and storage display device 15 that reveals the presence of contraband on the person 11 or in the parcel 16 that he is carrying.

Line detector 21 is carried by long arm 22 which support X-ray tube 23 at the other end, the assembly being pivotal about an axis substantially passing through the slit of slit collimator 24. As the sector 13 is scanned, detector 21 assumes a lowermost position 21' with arm 22 in position 22' and X-ray tube 23 in position 23'. The other extreme of sector 13 is with detector 21 in position 21", arm 22 in position 22" and X-ray tube 23 in position 23".

A modulation disc 25 is positioned adjacent to a slit collimator 24 and rotates to produce pencil beam 26 that scans line detector 21 from left to right as disc 25 rotates in a clockwise direction. Slit collimator 24 and modulation disc 25 are made of X-ray opaque material and formed with slits that may be covered with X-ray transparent material. The radial slits, such as 27, are deep enough to provide an X-ray transparent opening opposite the slit in the slit collimator as each radial slit 27 moves across the horizontal slit in collimator 24.

Mechanical details of the means for supporting the various elements are not illustrated so as not to obscure the principles of the invention. The mechanism for effecting the angular scan across the sector 13 are well known in the art and not a part of the invention. Similarly, the techniques for rotating and supporting modulation disc 27 are well known in the art and not a part of the invention.

The geometry and timing of the system is arranged so that each radial slit causes a new pencil beam to strike the left of detector 21 just after the previous pencil beam has swept pass the right end of the detector. That is to say, the width of the fan beam provided by slit collimator 24 corresponds substantially to the separation between adjacent ones of the radial slits at substantially the maximum radial distance from the edge of the disc where the slits intercept the fan beam. While FIG. 1 shows the elements that provide the scanning pencil beam in a form to better illustrate the principles of the invention, the elements 23, 24 and 25 are preferably housed relatively close together in an enclosure that shields radiation so that the only significant radiation energy that escapes is that in pencil beam 26.

The person being scanned differentially attenuates the X-rays in pencil beam 26 incident upon detector 25 so that the electrical signal provided on output line 28 is amplitude modulated in proportion to the instantaneous X-ray flux incident upon it. This signal thus corresponds to a horizontal line image of the transmissivity of person 11 and parcel 16 and is analogous to one scan line of a television video signal. As the assembly moves angularly through sector 13, sequential pencil beams intercept slightly displaced regions of person 11 and parcel 16 so that the corresponding electrical signals from detector 21 may be appropriately displayed line-by-line to produce a two-dimensional image of the person 11 and the parcel 16 being carried in X-rays analogous to the display of a picture on a television monitor as formed by line-by-line images. The output of detector 21 is thus a video signal that may be processed in accordance with the same storage and display techniques used in conventional video systems to store and display single raster images. Since these techniques are well known in the art, further discussion of them is unnecessary here.

Although detector 21 is shown behind the person being scanned for responding to the radiant energy transmitted through the person, it is within the principles of the invention to position the detector in the region between the radiant energy source and the person being scanned to respond to the scattered energy. This arrangement helps the apparatus detect concealed objects having different scattering characteristics from their surroundings. Moreover, a system according to the invention may include both detecting means before and behind the person being scanned for simultaneously providing signals representative of both radiant energy transmission and scattering. Appropriately combining such signals may help increase the ability of the system to detect a wide variety of concealed objects.

With reference now to FIG. 2, there is shown a view through section 2—2 of FIG. 1 illustrating the preferred cross section of the slit in slit collimator 24. The entrance side of the slit is bounded by beveled edges 31 and 32 and the exit side, by beveled edges 33 and 34. Edges 31 and 32 are parallel to edges 34 and 33, respectively, so that as scanning occurs over sector 13, the thickness of the fan beam emitted on the exit side remains substantially constant. The cross section of the slit may take alternate forms dependent upon the angle being scanned, but is preferably arranged so that the separation between planes co-extensive with a pair of parallel faces is substantially the same. Alternately, if it were desired to angularly scan from a horizontal position, only one pair of edges would be beveled.

Referring to FIG. 4, there is shown a combined pictorial schematic representation of a preferred form of detector 21. The detector comprises a number of cascaded segments of sodium iodide or cesium iodide crystals, such as 35-37, imbedded in light pipe material, such as (U.V. transmitting) lucite, with photocells 41 and 42 at each end having their outputs combined in parallel on lines 43 and 44, preferably for amplification before being transmitted over output line 28 carried by arm 22. The light pipe 38 is typically two to three inches in diameter and of the order of three feet long with one of segments 35-37 being typically of cross-section 0.5 inch × 0.5 inch and length 6 inches so that six segments glued together form an integral detector 0.5 inch × 0.5 inch × 36 inches. Preferably the detector assembly is encased in X-ray opaque material, such as lead, with only the faces of segments 35-37 exposed through an X-ray transparent slit.

This form of detector has a number of advantages. It is nearly 100 percent efficient in terms of picking up all the visible light radiated by the imbedded sodium iodide crystal elements. It is practical and relatively inexpensive to provide the relatively small crystals that are imbedded in the lengthwise slit of light pipe 38.

A specific embodiment of the invention may provide a dose delivered to a subject per image of only 0.01 mR, provide a spatial resolution of 3mm × 3mm, scan an image plane 3 × 6 feet, provide an image in 4 seconds on a television monitor, provide an imaging X-ray detection efficiency of greater than 99 percent and background detection efficiency of less than 1 percent. An important feature of the invention is that scattered radiation is effectively reduced by 99 percent or more without the use of any special equipment by having a very narrow lead-formed entrance slit along the length of the detector without interfering with the imaging process in any way. The width of this slit need only be the size of the pencil beam, typically not more than one five-hundredth of the image itself. At any instant of time only about one five-hundredth of the total scattered radiation is detected, and only this much contributes to the background level. Since the scattered intensity is never more than 10 or 20 times the primary intensity for even the thickest regions of the body, the techniques according to the invention eliminate at least 99 percent of the scatter to produce primary images which are virtually scatter free to improve the contrast obtained when thick regions of the body, such as the abdomen and pelvic area are examined. This feature helps allow metallic objects concealed over these regions to be detected. And scatter reduction is effective over a wide range of X-ray energies.

Some typical parameter values for an exemplary system are source-detector distance of 7 feet, detector width 3 feet, separation of modulation disc 25 from source 22, 18 inches, imaging plane 6 feet high × 3 feet wide, modulating disc 25 diameter 18 inches with six slits rotating at 1,800rpm to generate 720 horizontal scan lines in a 4 second vertical scan with the slits of the order of 0.4mm wide and the focal spot of the X-ray tube 22 substantially 0.5mm. The resulting 3mm$^2$ spot size facilitates detecting a knife on edge only a few milliemters wide in one dimension. Preferably photodetectors 41 and 42 are photomultipliers providing outputs that may be appropriately amplified to provide an ordinary video signal for display on an image storage tube. X-ray tube 22 may be a conventional high-power rotating anode tube typically used universally for medical diagnostic radiology and operated typically at 150kv amd 80ma.

There has been described a novel radiant energy imaging system characterized by exceptionally low radiation, high resolution, ease of operation and assembly and other features. It is evident that those skilled in the art may now make numerous uses and modifications of and departures from the specific embodiments described herein without departing from the invention concepts. Consequently, the invention is to be construed as embracing each and every novel feature and novel combination of features present in or possessed by the apparatus and techniques herein disclosed and limited solely by the spirit and scope of the appended claims.

What is claimed is:

1. Radiant energy imaging apparatus comprising,
a source of radiant energy,
radiant energy detecting means for providing a signal representative of radiant energy upon a curve defined thereby,
means for supporting said source and said detecting means in fixed relative relationship for pivotal movement about an axis included in an aperture plane therebetween,
means defining an aperture in said aperture plane for movement along a predetermined path embracing said axis for scanning said curve with a beam of radiant energy from said source,
and means for angularly displacing said means for supporting about said axis over a predetermined angle for coacting with the aperture defining means for two-dimensionally scanning an object between said aperture plane and said detecting means to produce a sequence of image signals representative of the radiant energy response of the medium in a region traversed by said beam of radiant energy along a path from said source to said radiant energy detecting means.

2. Radiant energy imaging apparatus in accordance with claim 1 wherein said means defining an aperture is formed with at least one pair of beveled edges included in parallel planes separated by a distance corresponding to the thickness of a radiant energy beam emitted through said aperture.

3. Radiant energy imaging apparatus in accordance with claim 2 wherein there are two pairs of said beveled edges with one edge in each pair being at the input of said aperture and the other edge of each pair being at the output of said aperture.

4. Radiant energy imaging apparatus in accordance with claim 1 wherein said means for supporting comprises an arm pivotable about said axis carrying said detecting means at one end and said source at the other end and said means defining an aperture comprises,
means defining a stationary slit for transmitting radiant energy therethrough and a rotatable disc formed with radial slits therein adjacent to said stationary slit so that rotation of said disc causes said radial slits to sequentially scan from one end of said stationary slit to the other for scanning said curve.

5. Radiant energy imaging apparatus in accordance with claim 4 and further comprising a television system responsive to the signal provided by said detecting means for displaying an image representative of the response of an object between said detecting means and said aperture plane to said radiant energy.

6. Radiant energy imaging apparatus in accordance with claim 1 wherein said radiant energy detecting means comprises,
a light pipe with radiant energy-to-light transducing crystals imbedded therein,
and photoelectric transducing means responsive to the light emitted by said transducing crystals for providing a video signal.

7. Detecting means in accordance with claim 6 wherein said photoelectric transducing means is located at at least one end of said light pipe.

8. Detecting means in accordance with claim 7 wherein said photoelectric transducing means is located at both ends of said light pipe.

9. Detecting means in accordance with claim 6 wherein said light pipe is circularly cylindrical and formed with a longitudinal slit along the length thereof in which said crystals are imbedded.

10. Detecting means in accordance with claim 9 wherein said light pipe is formed with opposed end faces and said photoelectric transducing means comprises photocells adjacent each end face.

* * * * *